Patented May 7, 1929.

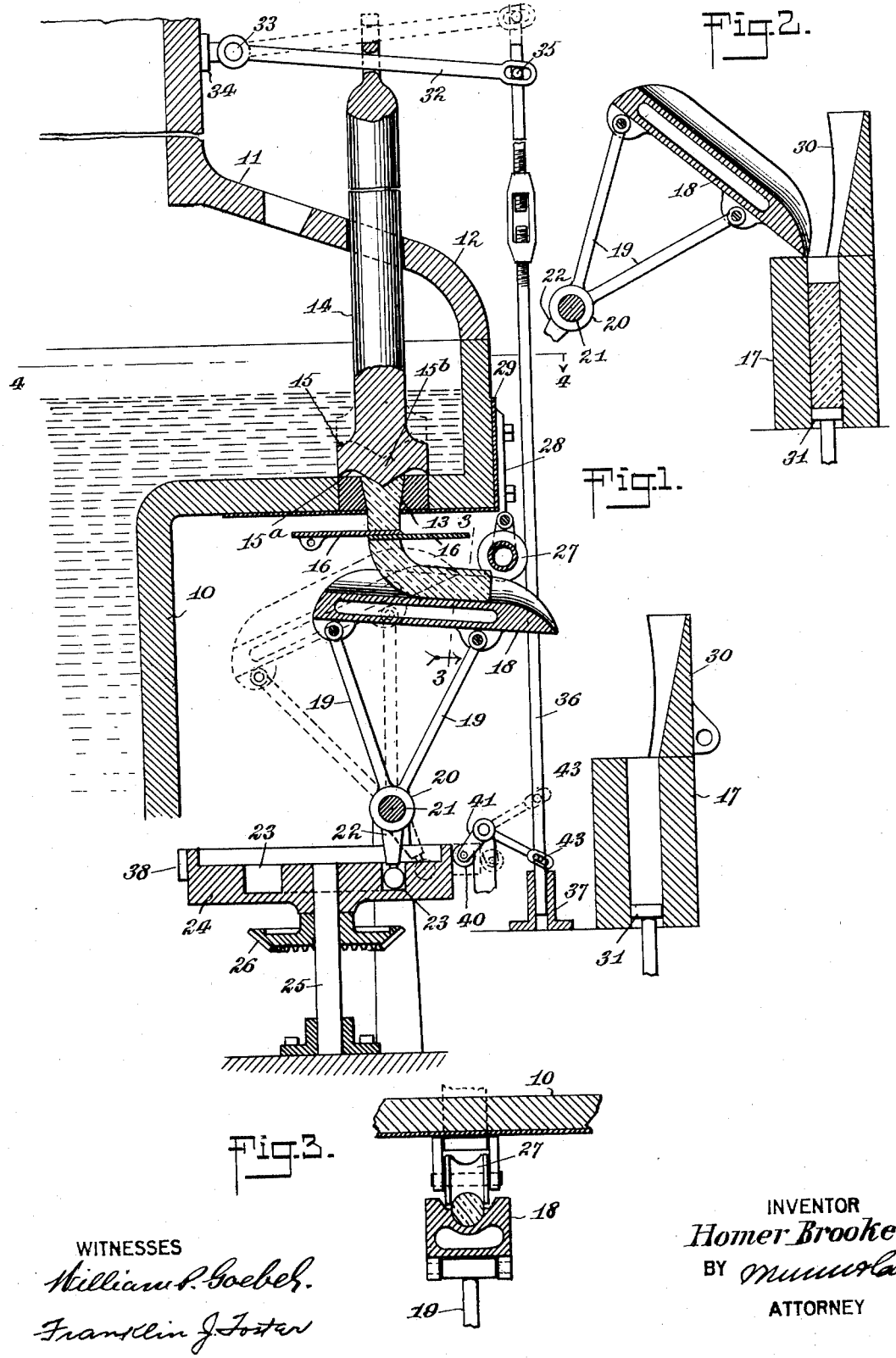

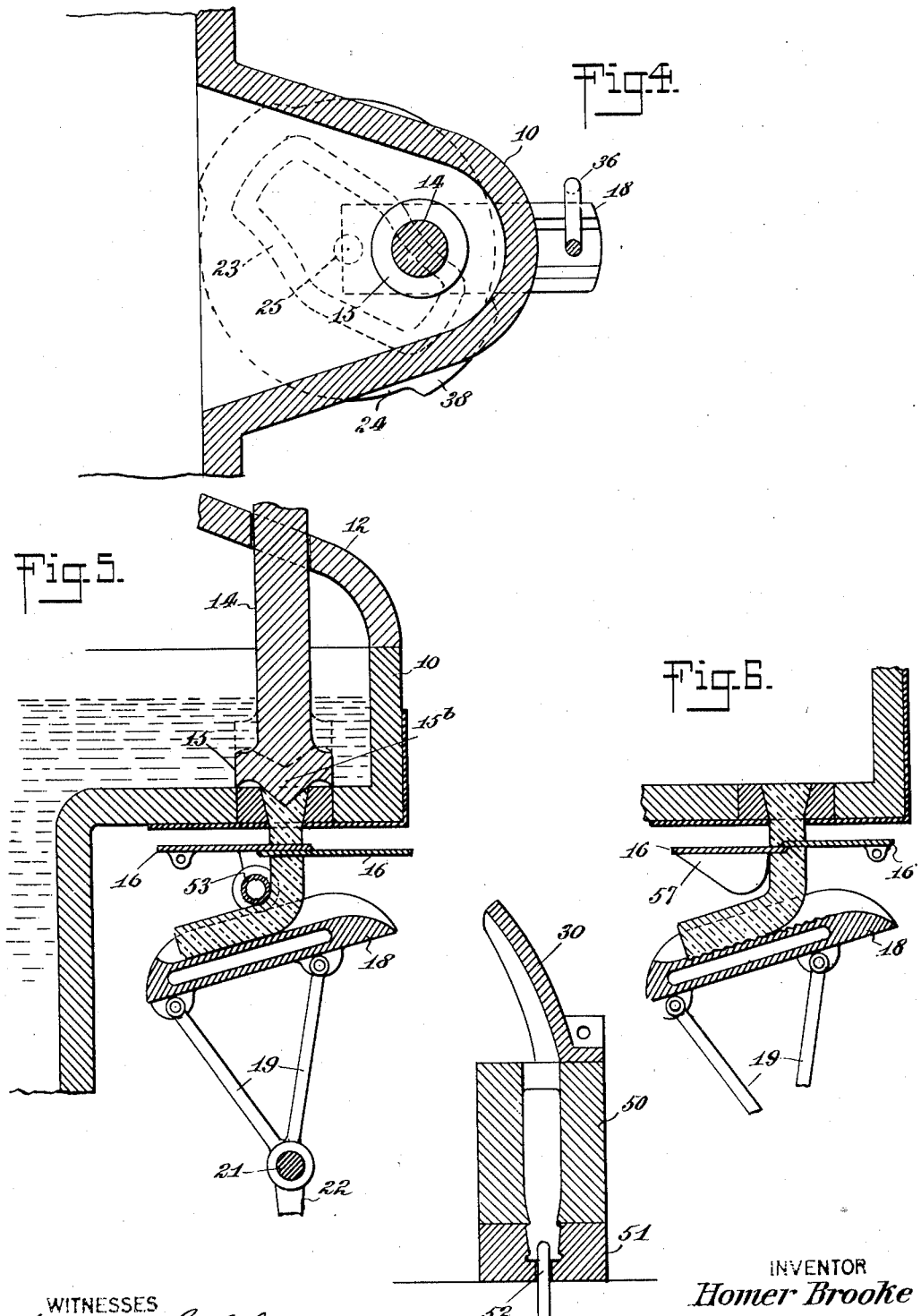

1,712,327

UNITED STATES PATENT OFFICE.

HOMER BROOKE, OF MOUNT VERNON, NEW YORK; MARY ISAPHENE IVES BROOKE EXECUTRIX OF SAID HOMER BROOKE, DECEASED.

GLASS-SERVING APPARATUS.

Application filed January 25, 1927. Serial No. 163,485.

The present invention is concerned with the provision of a novel method of, and apparatus for delivering molten slugs of glass from a glass furnace to any suitable type of finishing machine which forms various articles of commercial glassware from the molten slugs.

A primary object of the invention is to provide a simple, practical mechanism for flowing a slug from the furnace, severing the slug and delivering the slug into a container in such position that the hot end of the slug will be subsequently arranged adjacent the moulding form.

In automatic bottle making machines, the glass slugs are delivered into containers forming part of a sectional mould, the container walls serving to predetermine the contour of the bottle which is produced. The neck of the bottle is usually formed by a separate cooperating mould section associated then or later with the container which has received the molten slug from the furnace. In accordance with the usual method of flowing and serving the slugs, the colder end of the slug is received in the neck forming mould, consequently considerably slowing up the moulding operation and rendering the machines less efficient in use.

By use of the present apparatus I eliminate this inconvenience, entering the slug into the original container in such a manner that the hotter end of the slug may be subsequently used when moulding the neck of a bottle.

It is to be understood at the outset however, that the particular mechanism which is used to handle the slug after it has been severed and dumped or otherwise placed into a container is subject to a wide range of variation, and that the glass serving apparatus which I have herein illustrated, may, with slight modifications, be conveniently associated with any conventional type of machine used for automatically forming commercial glassware, or may be used to deliver hot slugs of glass even where subsequent manual treatment rather than automatic treatment is to be had.

In one embodiment of the invention, the slug is gravitationally flowed from a discharge orifice in the bottom of the conventional glass furnace bay, severed, emplaced on a rocking dumping trough, and dumped into a container. In order that the slugs may be of uniform thickness rather than assuming a somewhat globular attenuated shape, I provide means for expediting the flow of the glass which forms the tail end of the slug. This means for assisting gravity may conveniently comprise a plunger acting to equalize the diameter of the slug by actually extruding the tail end of the slug through the orifice, and to subsequently close the orifice. Vertical reciprocating movement of the plunger is so synchronized with the rocking movement of the dumping receptacle for the slugs, that the slug at the time it is severed, has for the most part assumed a reclining position in the dumping trough. Inasmuch as the entire operation is a very rapid one, and repeated many times a minute, I find it necessary in some instances to provide means to expedite the gravitational laying down of the slug in the moving dumping trough, so that the slug will be straightened out before the trough moves to position to gravitationally eject it.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in vertical section through a glass furnace and associated serving mechanism embodying the present invention.

Fig. 2 is a fragmentary view showing the position of the dumping trough just after the slug has been discharged into the container.

Fig. 3 is a vertical sectional detail on the line 3—3 of Fig. 1.

Fig. 4 is a sectional plan view taken approximately on the line 4—4 of Fig. 1.

Fig. 5 is a view similar to Fig. 1, omitting parts of the actuating mechanism for the sake of clearness, and showing an arrangement by which the hot end of a slug instead of the cold end may be introduced first into an associated container.

Fig. 6 is a view similar to Fig. 5, but illustrating a slight modification.

Referring first to Figs. 1 to 4 inclusive of the drawings, I have used the reference character 10 to designate the body of a glass furnace which with its associated cap 11 cooperatively defines a laterally projecting bay 12 in which molten glass from the main pool in the furnace flows. The bottom of the bay 12 is formed with the usual discharge orifice 13 through which slugs of molten glass are flowed. A plunger 14 mounted for vertical reciprocation through the roof of the bay 12 includes an enlarged head portion 15 adapted to force the molten glass through the opening and a depending central conical projection 15$^b$ adapted to seal the outlet opening 13 at the end of each downward stroke. The usual slug severing knives 16 have been shown arranged under the outlet opening, but for the sake of clearness, I have omitted their operating mechanism which may be entirely conventional. Means is provided for receiving the slugs discharged through the opening 13 and delivering them into a container such as 17 which may be transported subsequently to any desired finishing machine, or may form one of the moving parts of a finishing machine (not shown).

The mechanism for handling the slugs and delivering them to the container 17 has been illustrated as an oscillatory dumping trough 18 supported on arms 19 integral with a hub 20 which rotates on a horizontal shaft 21. This hub carries a tail piece 22 working in a cam race or groove 23 in a cam 24. The cam itself is disposed in horizontal position and rotates on the upper end of a vertical shaft 25 driven from any suitable source of power as through the gear 26, in unison with a glass making machine (not shown).

The shape of the cam groove is such that upon each revolution of the cam, the dumping trough is twice oscillated from the dotted line position of Fig. 1 to the full line position of Fig. 2 and back again, thereby receiving two slugs of glass from the furnace and dumping them into suitable containers 17. Obviously, the cam may be shaped to retard or speed up the trough at the proper times in order to handle the slugs with all due accuracy and expedition.

In Fig. 1 I have shown a slug completely ejected from the furnace and lying on the dumping trough which has shifted from the dotted line to the full line position to receive it. Movement of the trough from the dotted line to the full line position occupies substantially the same time interval as the interval necessary to discharge a complete slug. Plunger 14 in Fig. 1 has sealed the outlet opening and this plunger does not start to rise again until the dumping trough has moved to the position of Fig. 2 and almost returned to the dotted line position of Fig. 1. It will be noted that in Fig. 1, the tail end of the slug has not yet had time to assume a reclining position on the trough, and in fact the movement of the trough is so rapid that the slug may not have a chance to completely straighten itself out by gravity before it is dumped into the container 17. I therefore provide a roller 27 hung from a suitable bracket 28 on the ironwork 29 which encases the bay. This roller smooths out the tail end of the slug as the trough moves forwardly, thereby assisting gravity to straighten the slug and assuring that the slug is in proper shape when it enters the container. Preferably a stationary guide member 30 is associated with each movable container 17 as the latter come into place, so that the slug will be properly guided into position. This guide may also serve to shape the slug.

As illustrated, the container 17 is formed with a false bottom in the nature of a plunger head 31, and after the container has received the slug it is moved on mechanically or by hand, a bottle neck forming section applied to the top thereof, and the plunger pushed upwardly to mould the neck of the bottle. Thus, the hot end of the slug being at the top of the container is in proper position to engage the neck forming mould (not shown).

There are two factors which tend to prevent attenuation of the slug as it is delivered from the orifice. In the first place, the slug-carrying dumping trough is moving forwardly as the slug is being delivered at a rate of speed substantially the same as the rate at which the slug is dropping from the furnace. Thus most of the weight of the lower end of the slug is taken by the carrier, preventing globular formation at the front end and attenuation at the tail end of the slug. Furthermore, the plunger head 15 being slightly cut on its under face as indicated at 15$^a$, entraps a small portion of the molten glass and serves to positively extrude the tail end of the slug, thereby assisting gravity and moving the tail end of the slug through at a rate which prohibits attenuation.

The mechanism for synchronizing the movement of the dumping trough with the movement of the plunger 14 has been shown rather diagrammatically, and in fact the entire drawing is of a diagrammatic nature, no means being shown for bearing the shaft 21, supporting the stationary guide 30, etc. As illustrated, the plunger 14 is operatively connected at its upper end to the intermediate portion of a lever 32 fulcrumed at 33 in a bracket 34 secured to iron work of the furnace wall. The other end of the lever has a slot and pin connection at 35 with a vertical link 36 guided at its lower end in a socket 37. Mounted on the edge of the cam 24 is a second cam 38 having grooves 39 therein which cooperate with a roller 40 on the end of a lever 41 to rock the lever. This lever pivoted intermediate its ends as at 43 has a slot and pin connection at 43 with the link 36.

In operation, assuming that the parts are in the position of Fig. 1, the dumping trough continues to move forward until it reaches the position of Fig. 2, the tail of the slug having in the meantime been laid down by the roller 27. As the dumping trough reaches approximately the position of Fig. 1 on its return stroke, the plunger again lifts, the knives having meanwhile been withdrawn. By the time the dumping trough reaches the dotted line position of Fig. 1, the plunger will have reached its upper position, and the slug will start to deposit on the trough, the trough moving forwardly at approximately the same rate of speed as the rate of flow of the slug. Just prior to the time that the dumping trough again reaches the full line position of Fig. 1 in its forward movement, the plunger has seated and extruded the tail end of the slug and the knives have moved together to sever the slug. This operation is repeated many times a minute, the speed being limited only by the somewhat sluggish action of the molten glass.

In Fig. 5 I have shown an apparatus generally similar to that of Fig. 1, except that in this instance I dump the slug into the container with the cold end of the slug uppermost. Here, the container 50 is formed with a neck moulding section 51 with which there may be associated a bolw pipe 52. It is to be understood that in this form of the invention, as well as in the form of Fig. 1, a container is shifted out of the way and a new container substituted at each movement of the dumping trough. The mechanism for handling the container or for subsequently completing the manufacture of the glass articles, forming no part of the present invention. In Fig. 5, the only structural modification which I have illustrated is a roller 53 carried by one of the knives 16 instead of by the furnace. With this form of the invention, the dumping trough 18 is swinging rearwardly during the period that the slug is being discharged on to it, and after severing the slug, the hot end of the latter falls on the forward end of the trough. When the trough is moved forward to gravitationally eject the slug, the slug enters the container 50 with its cold end uppermost, and its hot end in proper position to enter the neck moulding member 51.

The showing of Fig. 6 is substantially the same as the showing of Fig. 5, except that I have substituted a smoothing cam 57 for the roller 53.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

I claim:

1. Apparatus for serving glass including in combination with a glass furnace and a lateral bay therein having a discharge orifice in its bottom, a tilting dumping trough arranged under the orifice on to which, slugs of glass flowed through the orifice are delivered, means for severing the slugs, and means for moving the dumping trough to slug-discharging position after each operation of the knives, the trough being arranged close to the discharge orifice and moving at a rate of speed which causes the major portion of the slug to be laid down thereon as the slug is discharging, and positive mechanical means for laying down the hot tail end of the slug on the dumping trough before the slug is dumped.

2. Apparatus for serving glass including in combination with a glass furnace and a lateral bay therein having a discharge orifice in its bottom, a vertically reciprocatory plunger for closing the orifice, a tilting dumping trough arranged under the orifice on to which, slugs of glass flowed through the orifice are delivered, means for severing a slug after each descent of the plunger to close the orifice, and means for moving the dumping trough to slug-discharging position after each operation of the knives, the trough being arranged close to the discharge orifice and moving at a rate of speed which causes the major portion of the slug to be laid down thereon as the slug is discharging, and means for laying down the hot tail end of the slug on the dumping trough before the slug is dumped, comprising a member arranged in the path of the slug to mechanically smooth down the hot tail end of the slug as the trough is moved.

3. Apparatus as described in claim 1, and wherein the means for laying down the tail end of the slug includes a roller arranged in the path of movement of the upstanding tail end.

4. A device of the class described in claim 1, wherein the means for laying down the tail end of the slug comprises a roller depending from the bay.

HOMER BROOKE.